LUMPED CONSTANT HYBRID JUNCTION

Filed May 19, 1965 2 Sheets-Sheet 1

CLAUDE STROTHER JR.
WILLIAM J. HOGAN
*INVENTORS*

BY J. M. St. Amand

*ATTORNEY*

LUMPED CONSTANT HYBRID JUNCTION

Filed May 19, 1965 2 Sheets-Sheet

CLAUDE STROTHER JR.
WILLIAM J. HOGAN
INVENTORS

BY J. M. St. Amand
ATTORNEY

United States Patent Office 3,383,629

Patented May 14, 1968

3,383,629

LUMPED CONSTANT HYBRID JUNCTION

Claude Strother, Jr., Encinitas, Calif., and William J. Hogan, Princeton, N.J., assignors to the United States of America as represented by the Secretary of the Navy Continuation-in-part of application Ser. No. 254,525, Jan. 28, 1963. This application May 19, 1965, Ser. No. 457,232

9 Claims. (Cl. 333—11)

The invention herein described may be manufactured and used by or for the Government of the United States of America for governmental purposes without the payment of any royalties thereon or therefor.

This is a continuation-in-part of U.S. patent application Ser. No. 254,525 filed Jan. 28, 1963, now abandoned.

The present invention relates to power dividers, multiplexing circuits, and more particularly to lumped constant hybrid junctions.

The purpose of the present invention is to combine, in a small amount of space with low loss, two, three or more coherent RF signals with a great amount of isolation between the input channels. Another purpose of this invention is to provide a power divider by which a single RF signal may be divided into two, three or more channels with little loss, and a great degree of isolation between the output channels.

Conventional hybrid rings may be made with coaxial cable to provide two inputs, one input sum channel and one output difference channel (such techniques are widely practiced). To sum three channels, using these conventional coaxial hybrid rings, it is necessary to use two of them in succession. A second type of multi-channel summing device is described in the article "Microwave Multiplexing Circuits" by R. E. Stone, Electronic Industries, November 1958. (A common resistive summer or divider may also be used; however, resistive devices introduce large losses.) The established methods of using coaxial cable hybrid rings for summers are much too bulky for miniaturized work, especially in lower frequencies as employed in IF circuits. Also coaxial cable hybrid rings are sharply frequency selective.

The present device, using lumped constant delay lines or maximally flat, constant time delay, all pass filters or other special networks in hybrid junction devices, overcomes the objections to prior devices. Further, networks for this purpose can be easily made from either balanced or unbalanced networks. U.S. Patent 2,410,114 to Warren A. Tyrrel for Coupling Arrangement for Use in Wave Transmission Equipment disclosed the use of T and pi networks to form the various arms of a simulated rat race or hybrid junction. However those prior T and pi networks have the deficiency of being suitable for use at a single frequency (or narrow band of frequencies) for this application. (The phase and amplitude response of these T and pi networks is discussed by John J. Karakosh, Transmission Lines and Filter Networks, Macmillan Co., 1950. In FIGURE 75 on page 274 Karakosh shows that the required 90° (i.e., equivalent to $\lambda/4$) of phase shift is obtained at seven-tenths of the cut-off frequency of the T network. And in FIGURE 74 it is seen that a 3 db loss is obtained at this frequency. Since a minimum of two T or pi networks are required, this indicates a minimum loss of 6 db. However, as the frequency is varied slightly upward, additional losses would be incurred from further attenuation and phase imbalance in the network and as the frequency of the signal were reduced, the reduced amplitude attenuation in the individual T or pi networks would be offset by the overall phase imbalance in the hybrid network.)

It is an object of the invention therefore to provide novel lumped constant hybrid junctions.

It is another object of the invention to provide means for combining two, three, or more coherent RF signals, having a great amount of isolation between input and output into a small space and with low loss.

It is a further object of the invention to provide a novel power dividing circuit using lumped constant delay lines.

Other objects and many of the attendant advantages of this invention will become readily appreciated as the same becomes better understood by reference to the following detailed description when considered in connection with the accompanying drawings wherein.

Figures 1, 2:
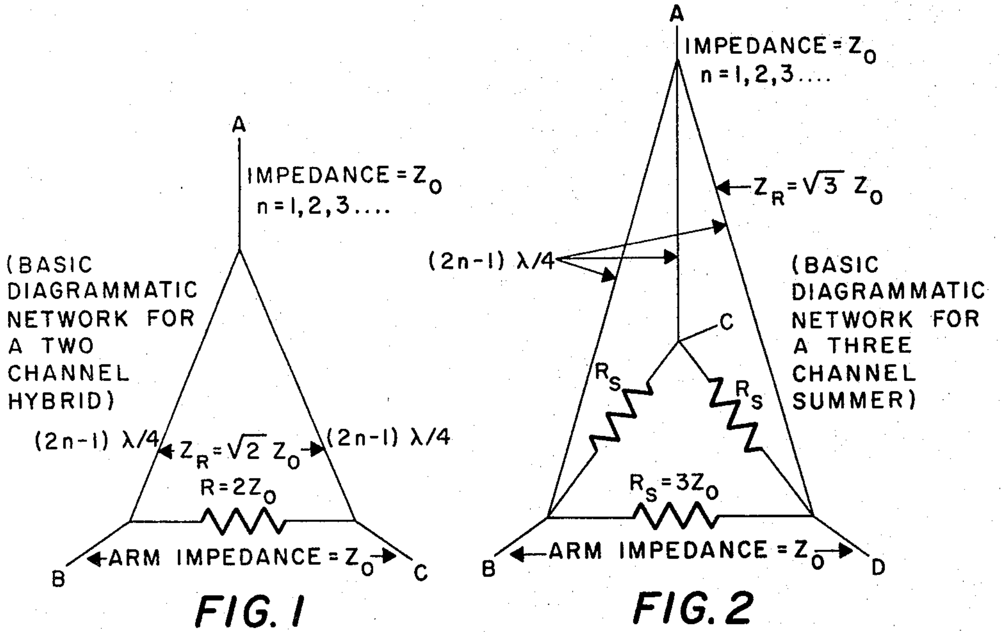
FIG. 1 shows a basic diagrammatic network for a two-channel hybrid device (summer or power divider) using odd multiples of ¼ wavelength ($\lambda$) networks.
FIG. 2 shows a basic diagrammatic network for a three-part hybrid device (summer or power divider).

The aforementioned article by R. E. Stone provides basic explanation for 2-to-1, 3-to-1, and higher order hybrid devices. Essentially a 2-to-1 unit is a conventional hybrid ring in which the difference channel and accompanying ¾-$\lambda$ length line are replaced by a resistive element, resulting in a network such as shown in FIG. 1. For the purpose of simplification only one line is shown for a transmission line in this diagram. This single line could correspond to the center conductor of a coaxial system, the strip in a stripline system, or one side of a two wire system; the return conductor is assumed to be present though not shown.

The ¼$\lambda$ networks are obtained by the common practice of computing the time for one period and then dividing by four. That is, the time delay required to produce a wave delay of one-fourth wavelength (or phase shift of 90°) may be obtained from the following formula:

$$\text{Time}=\frac{1}{4\times\text{frequency}}$$

where the frequency is considered as the mean or center frequency within the band limits—such as may be required to allow passage of short pulses—or when operating over a range of frequencies as required by a variable frequency source, etc.

The 3-to-1 hybrid device operates on the same principle as the 2-to-1 device, but using three ¼$\lambda$ length sections and three resistors, as shown in the one-line diagram of FIG. 2. In the event that a ¼$\lambda$ network is not readily realizable, and should an odd multiple of $\lambda/4$ be realizable, or otherwise desirable, these higher multiples may be substituted. That is, one arm could have the delay obtained from a ¾$\lambda$ network and the other arm could have the delay obtained from a 7⁄4$\lambda$ network.

Figure 3:
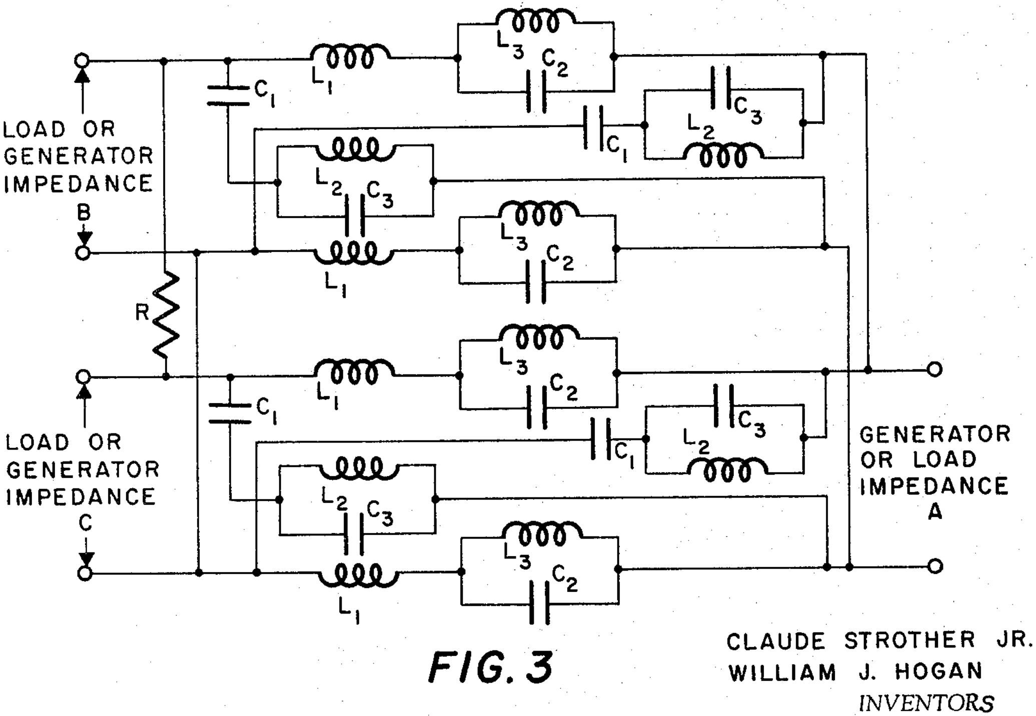
FIG. 3 is a detailed schematic diagram of a 2-to-1 hybrid device.
Figure 4:
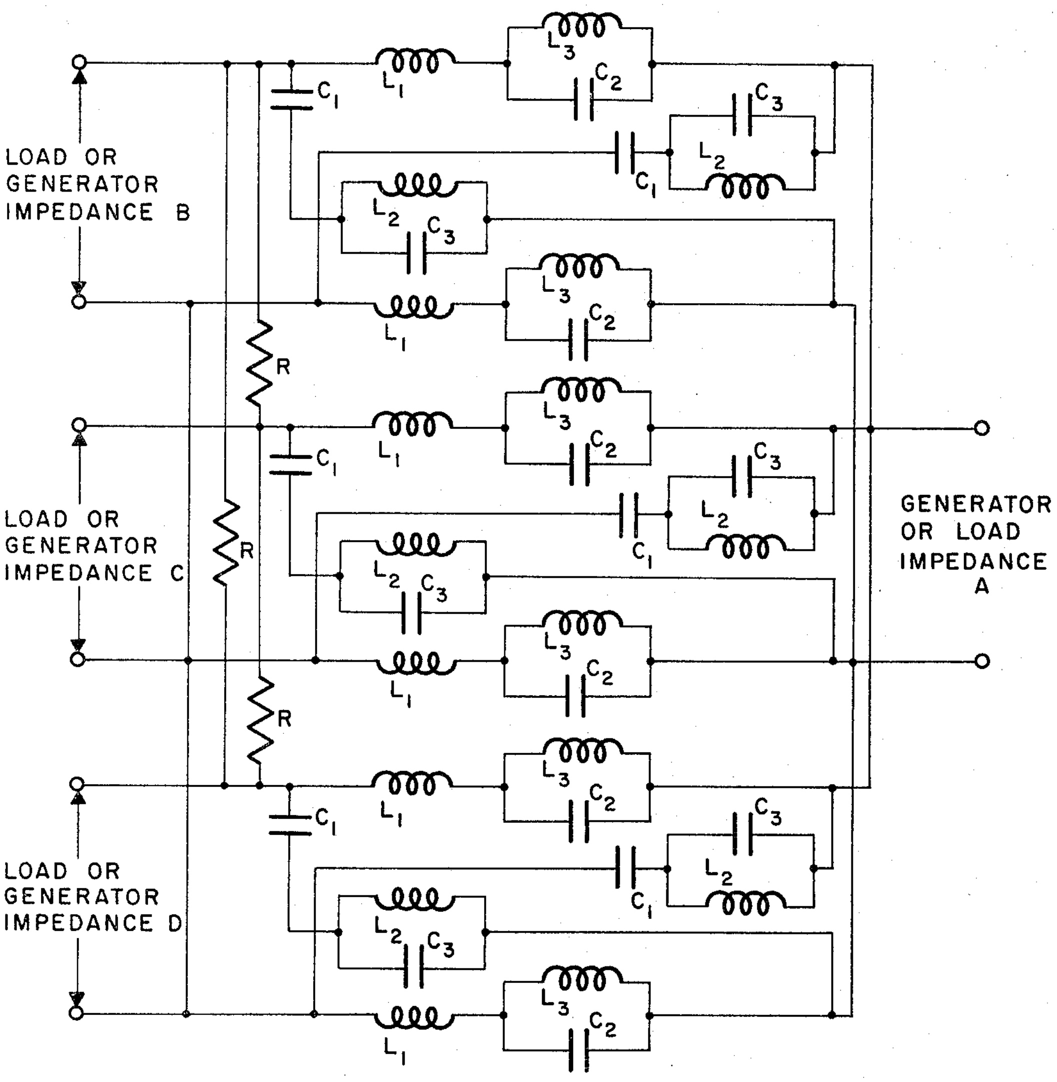
FIG. 4 is a detailed schematic diagram of a 3-to-1 hybrid device.

FIGS. 3 and 4 show detailed schematic diagrams of 2-to-1 and 3-to-1 embodiments, respectively, of present invention hybrid devices employing the maximally flat, constant time delay, all pass filter networks. A unique feature of these devices is that of using certain types of lumped constant ¼$\lambda$ length sections, as shown in the drawings and discussed below. The sections occupy a very small amount of space, use entirely passive elements, can be made for a wide range of frequencies, and operate over a broad band. A lattice network (as shown in FIGS. 3 and 4) is used to obtain the ¼$\lambda$ length sections. Typcial impedance and capacitance values for the schematic diagrams shown in FIGS. 3 and 4 for an operating frequency range of 12–18 mc./sec. are as follows: In FIG. 3, for example, $C_1=120$ f., $C_2=57.6$ f., $C_3=24.0$ f., $L_1=0.10$ h., $L_2=0.20$ h., $L_3=0.50$ h., and $R=100$ ohms. In FIG. 4, for example, $C_1=98$ f., $C_2=47.1$ f., $C_3=19.6$ f., $L_1=0.12$ h., $L_2=0.25$ h., $L_3=0.61$ h. and $R=150$ ohms. In both examples the matched generator and load impedances=50 ohms.

The design of the lattices used to obtain the $\frac{1}{4}\lambda$ length sections in FIGS. 3 and 4 is based on the article "Constant-Resistance All-Pass Networks with Maximally Flat Time Delay" by Louis Weinberg, Journal of the Franklin Institute, January 1959. Should operation be desired over an even wider bandwidth than feasible with the all-pass networks shown, circuits with constant amplitude characteristics and constant phase shift, as a function of frequency, may be employed. Such networks have been described by H. J. Orchard, "Synthesis of Wide-Band Two-Phase Networks," Wireless Engineer, Vol. 27, Mar. 1950, p. 72–81 and by G. C. Locke, "Properties of Some Wide-Band Phase Splitting Networks", Proc. IRE Vol. 37, Feb. 1949, p. 147–151.

The instant hybrid duplexer uses (lumped constant) networks with only limited similarity to transmission lines or conventional T or pi networks. The type of network that we used in our work, as described in the Weinberg reference, has the superior characteristic, over a transmission line or conventional T and pi sectors, of having a constant attenuation over a wide band of frequencies, thereby providing superior performance for the hybrid device. Further, use of the networks described by Orchard or Locke provide a device that has the additional superiority obtained from using networks which have both constant amplitude and phase response, as a function of frequency, i.e. allow operation of the hybrid device over wider bandwidths than realizable by use of the Weinberg circuits.

For hybrid junctions of higher order than shown, resistive paths R between input junctions can be star connected. In such cases the series resistive paths R connect all inputs to the delay lines to a common junction, such that the resistive paths between the inputs of any two delay lines are equal.

Another application of our invention may be obtained by using the mathematical techniques described by Grayzel and others (Alfred I. Grayzel, "A Synthesis Procedure for Transmission Line Networks", IRE Transactions on Circuit Theory, Sept. 1958, p. 172–181) by which sections of coaxial lines may be used to simulate elements of capacity and inductance, i.e. provide equivalent lumped constants. By this means the broad-band features of this invention may be realized in the microwave region from networks designed with sections of transmission line, waveguide, stripline, microstrip, etc.

Obviously many modifications and variations of the present invention are possible in the light of the above teachings. It is therefore to be understood that within the scope of the appended claims the invention may be practiced otherwise than as specifically described.

What is claimed is:

1. A hybrid junction circuit for RF signal multiplexing comprising:
(a) a pair of circuit output terminals,
(b) a plurality of delay line sections, equal to the number of inputs to be connected to the circuit output, each having their outputs connected in parallel across said output terminals,
(c) a plurality of pairs of input terminals equal to the number of delay lines, a pair of said input terminals connected to the input to each of said delay line sections,
(d) at least one series resistance path cross coupling together the various delay lines at the inputs thereto,
(e) the input impedance across each of said plurality of input terminals being substantially equal and matched to the load impedance across said output terminals.

2. A hybrid junction circuit for RF signal multiplexing comprising:
(a) a pair of circuit output terminals,
(b) a plurality of delay line sections, equal to the number of inputs to be connected to the circuit output, each having their outputs connected in parallel across said output terminals,
(c) a plurality of pairs of input terminals equal to the number of delay lines, a pair of said input terminals connected to the input to each of said delay line sections,
(d) at least one series resistance path cross coupling together the various delay lines at the inputs thereto,
(e) the input impedance across each of said plurality of input terminals being substantially equal and matched to the load impedance across said output terminals,
(f) said delay line sections consisting of maximally flat, constant time delay, all pass filters.

3. A hybrid junction circuit for RF signal multiplexing comprising:
(a) a pair of circuit output terminals,
(b) a plurality of delay line sections, equal to the number of inputs to be connected to the circuit output, each having their outputs connected in parallel across said output terminals,
(c) a plurality of pairs of input terminals equal to the number of delay lines, a pair of said input terminals connected to the input to each of said delay line sections,
(d) at least one series resistance path cross coupling together the various delay lines at the inputs thereto,
(e) the input impedance across each of said plurality of input terminals being substantially equal and matched to the load impedance across said output terminals,
(f) said delay line sections each consisting of an inductance- capacitance constant-resistance all-pass lattice network of entirely passive elements with maximally flat time delay.

4. A hybrid junction circuit for RF signal multiplexing comprising:
(a) a pair of circuit output terminals,
(b) a plurality of delay line sections, equal to the number of inputs to be connected to the circuit output, each having their outputs connected in parallel across said output terminals,
(c) a plurality of pairs of input terminals equal to the number of delay lines, a pair of said input terminals connected to the input to each of said delay line sections,
(d) at least one series resistance path cross coupling together the various delay lines at the inputs thereto,
(e) the input impedance across each of said plurality of input terminals being substantially equal and matched to the load impedance across said output terminals,
(f) said delay line sections consisting of maximally flat, constant time delay, all pass filters,
(g) the line impedance ($Z_R$) for each of said delay line sections being represented by the equation:

$$Z_R=Z_o\sqrt{N}$$

where $Z_o$ is the impedance across the input and output terminals of the circuit and N is the number of inputs to the circuit.

5. A hybrid junction circuit for RF signal multiplexing comprising:
(a) a pair of circuit output terminals,
(b) a plurality of delay line sections, equal to the number of inputs to be connected to the circuit output, each having their outputs connected in parallel across said output terminals,
(c) a plurality of pairs of input terminals equal to the number of delay lines, a pair of said input terminals connected to the input to each of said delay line sections, (d) at least one series resistance path cross coupling together the various delay lines at the inputs thereto, (e) the input impedance across each of said plurality of input terminals being substantially equal and matched to the load impedance across said output terminals, (f) said delay line sections consisting of maximally flat, constant time delay, all pass filters, (g) the line impedance ($Z_R$) for each of said delay line sections being represented by the equation:

$$Z_R = Z_o\sqrt{N}$$

where $Z_o$ is the impedance across the input and output terminals of the circuit and N is the number of inputs to the circuit, (h) the resistance of said series resistance paths being equal to $NZ_o$.

6. A hybrid junction circuit for RF signal multiplexing comprising:

(a) a pair of circuit output terminals, (b) a plurality of delay line sections, equal to the number of inputs to be connected to the circuit output, each having their outputs connected in parallel across said output terminals, (c) a plurality of pairs of input terminals equal to the number of delay lines, a pair of said input terminals connected to the input to each of said delay line sections, (d) at least one series resistance path cross coupling together the various delay lines at the inputs thereto, (e) the input impedance across each of said plurality of input terminals being substantially equal and matched to the load impedance across said output terminals, (f) said delay line sections each consisting of an inductance-capacitance constant-resistance all-pass lattice network of entirely passive elements with maximally flat time delay, (g) the line impedance ($Z_R$) for each of said delay line sections being represented by the equation:

$$Z_R = Z_o\sqrt{N}$$

where $Z_o$ is the impedance across the input and output terminals of the circuit and N is the number of inputs to the circuit.

7. A hybrid junction circuit for RF signal multiplexing comprising:

(a) a pair of circuit output terminals, (b) a plurality of delay line sections, equal to the number of inputs to be connected to the circuit output, each having their outputs connected in parallel across said output terminals, (c) a plurality of pairs of input terminals equal to the number of delay lines, a pair of said input terminals connected to the input to each of said delay line sections, (d) at least one series resistance path cross coupling together the various delay lines at the inputs thereto, (e) the input impedance across each of said plurality of input terminals being substantially equal and matched to the load impedance across said output terminals, (f) said delay line sections each consisting of an inductance-capacitance constant-resistance all-pass lattice network of entirely passive elements with maximally flat time delay, (g) the line impedance ($Z_R$) for each of said delay line sections being represented by the equation:

$$Z_R = Z_o\sqrt{N}$$

where, $Z_o$ is the impedance across the input and output terminals of the circuit and N is the number of inputs to the circuit, (h) the resistance of said series resistance paths being equal to $NZ_o$.

8. A hybrid junction circuit for RF signal multiplexing comprising:

(a) a pair of circuit output terminals, (b) a plurality of delay line sections, equal to the number of inputs to be connected to the circuit output, each having their outputs connected in parallel across said output terminals, (c) a plurality of pairs of input terminals equal to the number of delay lines, a pair of said input terminals connected to the input to each of said delay line sections, (d) a plurality of equal series resistance paths being star connected to a common junction and coupling together the various delay lines at the inputs thereto, (e) the input impedance across each of said plurality of input terminals being substantially equal and matched to the load impedance across said output terminals, (f) said delay line sections consisting of maximally flat, constant time delay, all pass filters, (g) the line impedance ($Z_R$) for each of said delay line sections being represented by the equation:

$$Z_R = Z_o\sqrt{N}$$

where $Z_o$ is the impedance across the input and output terminals of the circuit and N is the number of inputs to the circuit, (h) the resistance of said series resistance paths between one of said delay line inputs and said common junction being equal to the impedance $Z_o$.

9. A hybrid junction circuit for RF signal multiplexing comprising:

(a) a pair of circuit output terminals, (b) a plurality of delay line sections, equal to the number of inputs to be connected to the circuit output, each having their outputs connected in parallel across said output terminals, (c) a plurality of pairs of input terminals equal to the number of delay lines, a pair of said input terminals connected to the input to each of said delay line sections, (d) a plurality of equal series resistance paths being star connected to a common junction and coupling together the various delay lines at the inputs thereto, (e) the input impedance across each of said plurality of input terminals being substantially equal and matched to the load impedance across said output terminals, (f) said delay line sections each consisting of an inductance-capacitance constant-resistance all-pass lattice network of entirely passive elements with maximally flat time delay, (g) the line impedance ($Z_R$) for each of said delay line sections being represented by the equation:

$$Z_R = Z_o\sqrt{N}$$

where $Z_o$ is the impedance across the input and output terminals of the circuit and N is the number of inputs to the circuit, (h) the resistance of said series resistance paths between one of said delay line inputs and said common junction being equal to the impedance $Z_o$.

References Cited

"Time Delay Network Design," Louis Weinberg, Electronic Design, September 1957, copy in 333–29.

ELI LIEBERMAN, *Primary Examiner.*

M. NUSSBAUM, *Assistant Examiner.*